United States Patent

Inaba et al.

[11] Patent Number: 4,458,188
[45] Date of Patent: Jul. 3, 1984

[54] INDUSTRIAL ROBOT HAVING A FUNCTION FOR CONTROLLING A CURRENT OF A MOTOR FOR DRIVING

[75] Inventors: Hajimu Inaba; Hideo Miyashita, both of Hino; Shoichi Otsuka, Koganei, all of Japan

[73] Assignee: Fujitsu Fanuc Limited, Tokyo, Japan

[21] Appl. No.: 380,739

[22] PCT Filed: Sep. 18, 1981

[86] PCT No.: PCT/JP81/00237
§ 371 Date: May 13, 1982
§ 102(e) Date: May 13, 1982

[87] PCT Pub. No.: WO82/01090
PCT Pub. Date: Apr. 1, 1982

[51] Int. Cl.³ .............................. G05B 19/42
[52] U.S. Cl. ................... 318/568; 318/590; 318/681
[58] Field of Search ............. 318/568, 681, 590, 317

[56] References Cited

U.S. PATENT DOCUMENTS

| | | | |
|---|---|---|---|
| 3,934,186 | 1/1976 | Hayakawa | 318/568 |
| 3,990,020 | 6/1975 | Porter | 318/681 |
| 4,011,437 | 3/1977 | Hohn | 318/568 X |
| 4,206,394 | 6/1980 | Flandorfer | 318/681 X |
| 4,297,624 | 10/1981 | Komiya | 318/590 X |
| 4,300,080 | 11/1981 | Lee | 318/681 X |
| 4,348,623 | 9/1982 | Kobayashi et al. | 318/590 X |
| 4,373,150 | 2/1983 | Ritter | 318/317 X |

FOREIGN PATENT DOCUMENTS 53-45060 12/1978 Japan.

*Primary Examiner*—B. Dobeck
*Attorney, Agent, or Firm*—Armstrong, Nikaido, Marmelstein & Kubovcik

[57] ABSTRACT

Disclosed is an industrial robot having a function for controlling a current of a motor for driving, which comprises a circuit (41) for summing a plurality of input signals to which input signals of speed command, speed feedback, current command and current feedback are supplied, a switching circuit (23) for selectively switching the input of speed command to the inputs of current command and current feedback by a switching command signal and an operational amplifier (38) to which the switched signal is supplied. In this industrial robot, the position control is switched over to the current control by a switching command signal from a robot control device (22), and by the position control, an article to be held is shifted to a predetermined position and by the current control, driving electric motors (Mr, Mθ, Mz) are operated under a certain output torque to press the article to be held against other article under a certain torque, whereby the reliability of the operation of the industrial robot can be increased.

2 Claims, 4 Drawing Figures

INDUSTRIAL ROBOT HAVING A FUNCTION FOR CONTROLLING A CURRENT OF A MOTOR FOR DRIVING

DESCRIPTION

1. Technical Field

The present invention relates to an industrial robot having a function for controlling a current of a motor for driving.

2. Background Art

A direct current electric motor has heretofore been used for driving the shafts of an industrial robot, and a control circuit, as shown in FIG. 1, has been used for controlling the driving of the direct current electric motor.

The control circuit shown in FIG. 1, is operated as follows.

A position command input 11 is given, and in an adder 12, a difference between this position command input 11 and a position feedback signal 18 from a pulse coder 17 connected to an electric motor 16 is calculated and this difference is set at an error register 13. The set value is converted to an analog value by a digital-analog converter (DA converter) 19 and is supplied as a speed command signal to one input of a speed-controlling amplifier circuit 15. The position feedback signal 18 from the pulse coder 17 is converted to a voltage signal by a frequency-voltage converter (VF converter) 14 and this voltage signal is supplied as a speed feedback signal to the other output of the speed-controlling amplifier circuit 15. Driving of the electric motor 16 is controlled by the output of the speed-controlling amplifier circuit 15.

In an industrial robot comprising the above-mentioned control circuit, however, it is impossible to press an article to be held against another article under a certain output torque. For example, in the case where an article to be held is held only by the position control in a desirable fixed state on a chuck of a machine tool, for example, a lathe, it is difficult to hold the article on the chuck in a desirable fixed state. Accordingly, in an industrial robot having the above-mentioned circuit, though position control characteristics are satisfactory, the operation of pressing an article to be held against another article under a certain output torque cannot be performed.

The present invention proposes an industrial robot in which this problem of the conventional technique is solved.

DISCLOSURE OF THE INVENTION

It is a primary object of the present invention to provide an industrial robot, in which, in order to solve the above problem of the conventional technique, control of the position is performed by a position command and when an article to be held arrives at a predetermined position, the position control is switched over to the current control by a switching command signal, whereby it is made possible to press the article to be held against another article and the reliability of the operation of the industrial robot can be increased.

In accordance with one aspect of the present invention, there is provided an industrial robot having a function for controlling a current of a motor for driving, which comprises a circuit for summing a plurality of input signals to which input signals of speed command, speed feedback, current command and current feedback are supplied, a switching circuit for selectively switching the input of speed command to the inputs of current command and current feedback by a switching command signal and an operational amplifier to which said switched signal is supplied.

In accordance with another aspect of the present invention, there is provided an industrial robot having a function for controlling a current of a motor for driving, which comprises a robot control device, a switching circuit including a first switch which receives an output of the robot control device through a register and a digital-analog converter, is inserted in a circuit for input of the speed command and is closed at the position control while it is opened at the current control and a second switch which is inserted in a circuit for input of the current command and input of the current feedback and is opened at the position control while it is closed at the current control, a circuit for summing a plurality of input signals which receives the output of the switching circuit and to which inputs of speed command, speed feedback, current command and current feedback are supplied, an operational amplifier for receiving the output of the circuit for summing a plurality of input signals, and a driving electric motor for receiving the output of the operational amplifier.

BEST MODE FOR CARRYING OUT THE INVENTION

Figure 2:
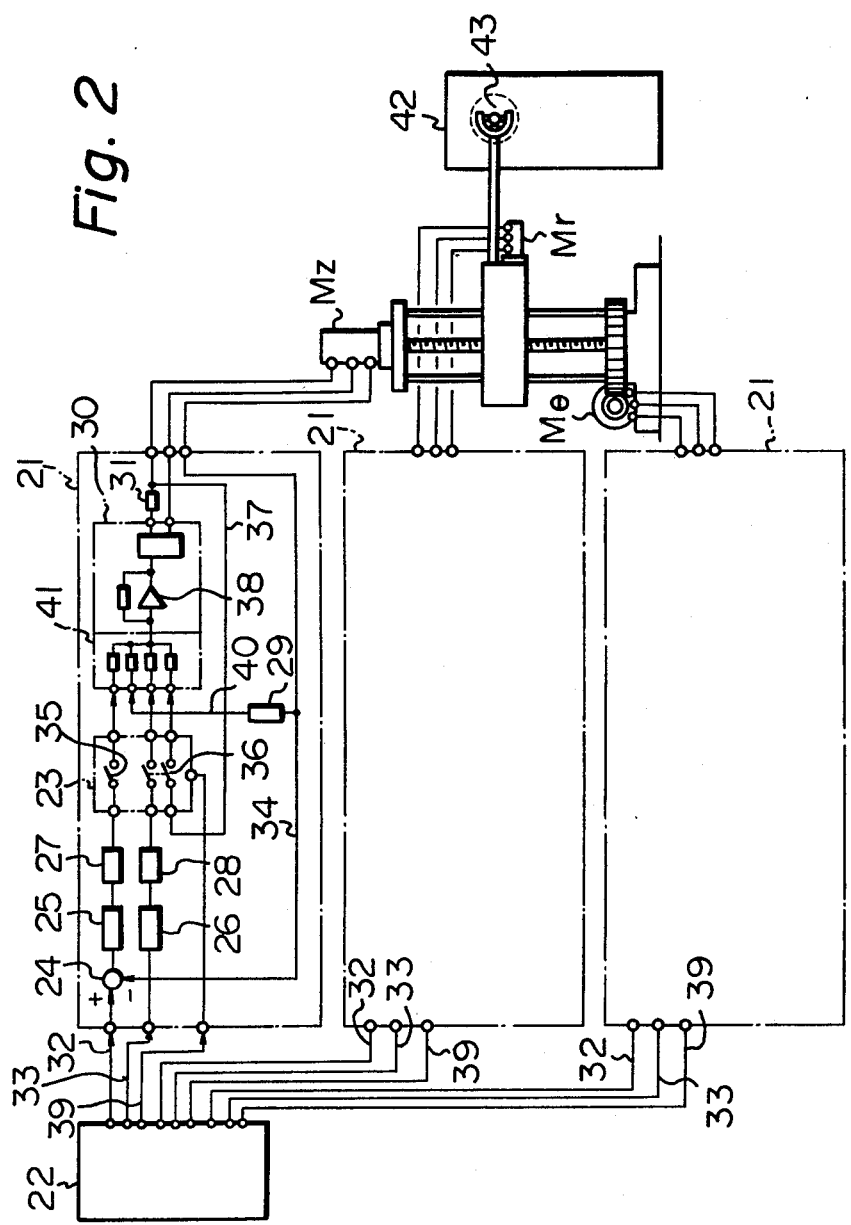
FIG. 2 is a diagram illustrating one embodiment of the industrial robot having a function for controlling a driving electric motor according to the present invention.

One embodiment of the industrial robot having a function for controlling a current of a motor for driving according to the present invention is illustrated in FIG. 2. One control circuit 21 is disposed for each of the three direction components r, $\theta$ and z determining the position of the robot, and the control circuits 21 have the same function. An input 32 of a position command signal is supplied to an adder 24, and the difference between this input 32 and a position feedback signal 34 from a pulse coder connected to an electric motor for driving the robot in any of the above three directions, for example, an electric motor Mz, is obtained from the output of the adder 24 and the output signal of the adder 24 is set at an error register 25. The output of the error register 25 is connected to a first switch 35 of a switching circuit 23 through a DA converter 27. An input 33 of a current command signal is set at a current value register 26 and is connected to one contact of a second switch, that is, an interlocking switch 36, of the switching circuit 23 through a DA converter 28. A position feedback signal 34 is supplied to a frequency-voltage converter 29 and converted to a voltage signal. The voltage signal is supplied to an input of an operational amplifier 38 through a circuit 41 for summing a plurality input signals. A current feedback signal 37 from a resistor 31 for detecting an electric current of the driving electric motor is supplied to the other contact of the interlocking switch 36. The speed command signal which has passed through the switch 35 is supplied to the input of the operational amplifier 38 through a first input of the circuit 41 for summing a plurality of input signals. A speed feedback signal 40 from the frequency-voltage converter 29 is supplied to the input of the operational amplifier 38 through a second input of the circuit 41 for summing a plurality of input signals. The current command signal and current feedback signal which have passed through the interlocking switch 36 are supplied to the operational amplifier 38 through third and fourth inputs of the circuit 41 for summing a plurality input signals. An output of a speed command amplifier circuit 30 is connected to the driving electric motor through the resistor 31 for detecting an electric current of the electric motor.

The industrial robot shown in FIG. 2 is operated as follows.

Switching between the position control and the current control is performed by the switching command signal 39 from the robot control device 22. This switching command signal 39 is supplied to the switching circuit 23 to control the opening and closing of the switch 35 and the interlocking switch 36. When the position control is carried out, the switch 35 is closed by the switching command while the interlocking switch 36 is opened, whereby the speed command signal and speed feedback signal are supplied to the input of the operational amplifier 38 and control is made so that the article to be held is shifted to a desirable position according to the position command signal 32 from the robot control device 22. When the position control is changed over to the current control, the switch 35 is opened by the switching command signal 39 while the interlocking switch 36 is closed, whereby the current command signal, current feedback signal and speed feedback signal are supplied to the input of the operational amplifier 38. The driving electric motor is controlled by an output signal of the current value register 26 set by the current command signal 33 from the robot control device 22. In this case, not only the current feedback signal, but also the speed feedback signal, is put in the operational amplifier 38. Accordingly, the driving electric motor is rotated at a stable speed, and when the movement of the article is blocked by a stationary wall, such as a chuck end face 43 of a lathe 42 and the article is stopped, the speed feedback signal becomes equal to zero, and, hence, the current value of the driving electric motor becomes equal to the set current command value. Namely, a certain output torque is obtained in the driving electric motor. The change of the position caused by rotation of the driving electric motor by the current control is stored in the error register 25 in advance so that the position information is retained.

Figure 1:
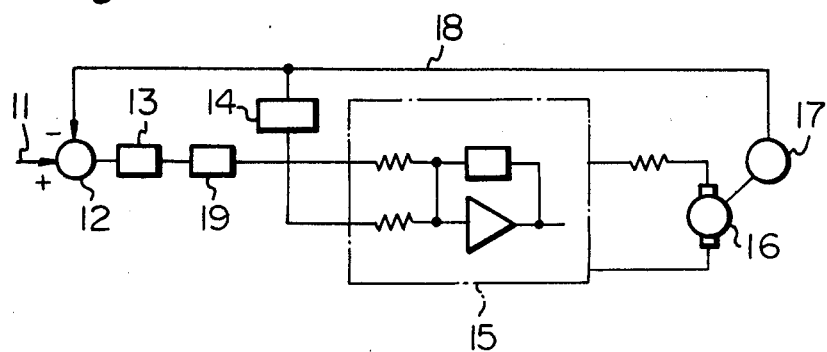
FIG. 1 is a circuit diagram illustrating a driving electric motor-controlling circuit used for the conventional industrial robot.
Figure 3:
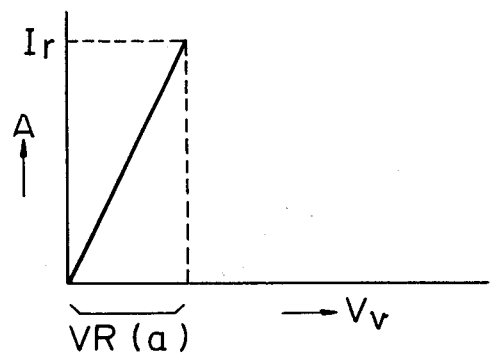
FIG. 3 is a characteristic diagram illustrating the relation between a speed command signal and an electric current of an electric motor observed when the position control is carried out in the circuit shown in FIG. 2.

The relation between the speed command signal Vv and the electric current A of the direct current electric motor observed when the position control is carried out is illustrated in a characteristic diagram of FIG. 3. From the characteristic diagram of FIG. 3, it is seen that by a very small speed command signal VR(a) (the order of millivolt), the electric current of the direct current electric motor is elevated substantially to a level of the rated current Ir. More specifically, when the position is deviated from the predetermined position, the direct current electric motor is rotated at a rated output to move the article to the vicinity of the predetermined position promptly, and when the article is brought close to the predetermined position, the speed of the electric motor is abruptly reduced and the motor is stopped when the article is set at the predetermined position. In this case, a very large output torque is produced even for a slight deviation of the position.

Figure 4:
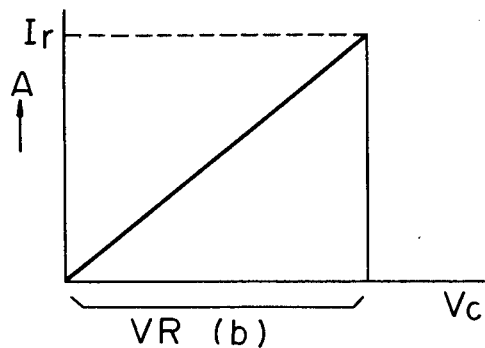
FIG. 4 is a characteristic diagram illustrating the relation between a current command signal and an electric current of an electric motor observed when the current control is carried out in the circuit shown in FIG. 2.

The relation between the current command signal Vc and the electric current A of the direct current electric motor observed when the current control is carried out is illustrated in a characteristic diagram of FIG. 4. From FIG. 4, it is seen that the electric current A of the direct current electric motor has a relatively small gradient as compared with the current command signal Vc. In this case, by causing the current feedback signal and speed feedback signal to co-operate with each other, the current control can be performed stably and the direct current electric motor can be driven under a certain output torque. In FIG. 4, Ir represents the rated current and VR(b) is several hundred millivolts.

We claim:

1. An industrial robot having a function for controlling a current of a motor for driving, having a robot control device, three electric motor control circuits for controlling the positioning of said robot in three directions, and three electric motors driven through said electric motor control circuits, respectively, each of said electric motor control circuits comprising:
    an adder means for receiving a position command signal from said robot control device;
    a circuit means for summing a plurality of input signals and for receiving the output of said adder; and
    an amplifier circuit means for amplifying the output of said summing circuit means, a position feedback signal from a pulse coder linked to said electric motor being fed back to said adder means and said summing circuit means, wherein each of said electric motor control circuits comprises a switching circuit between said adder means and said summing circuit means, said switching circuit receiving the output of said adder means, a current command signal from said robot control device, a current feedback signal corresponding to the drive current of said electric motor, and a switching command signal from said robot control device, said switching circuit being switched so that the output of said adder means is supplied to said summing circuit means at the positioning control, the current command signal and the current feedback signal being then supplied to said summing circuit means at current control.

2. The industrial robot of claim 1, wherein said switching circuit comprises a unipolar switch and a bipolar interlocking switch.

* * * * *